United States Patent
Lignon

(10) Patent No.: US 8,725,415 B2
(45) Date of Patent: May 13, 2014

(54) METHOD AND DEVICE FOR LONG-DURATION NAVIGATION

(75) Inventor: Christian Lignon, Paris (FR)

(73) Assignee: Sagem Defense Securite, Paris (FR)

( * ) Notice: Subject to any disclaimer, the term of this patent is extended or adjusted under 35 U.S.C. 154(b) by 228 days.

(21) Appl. No.: 13/502,473

(22) PCT Filed: Oct. 19, 2010

(86) PCT No.: PCT/EP2010/006360
§ 371 (c)(1),
(2), (4) Date: Apr. 17, 2012

(87) PCT Pub. No.: WO2011/047822
PCT Pub. Date: Apr. 28, 2011

(65) Prior Publication Data
US 2012/0203456 A1    Aug. 9, 2012

(30) Foreign Application Priority Data
Oct. 22, 2009  (FR) ...................................... 09 05076

(51) Int. Cl.
*G01C 21/10*    (2006.01)

(52) U.S. Cl.
USPC ...................................... 701/511; 73/504.03

(58) Field of Classification Search
USPC ........... 701/511, 505, 472; 73/504.03, 504.08
See application file for complete search history.

(56) References Cited

U.S. PATENT DOCUMENTS 6,594,911 B2 *   7/2003   Brunstein et al. ............... 33/318

FOREIGN PATENT DOCUMENTS

| EP | 0 392 104 A1 | 10/1990 |
| FR | 2 824 393 A1 | 10/1990 |

\* cited by examiner

*Primary Examiner* — Thomas Black
*Assistant Examiner* — Luke Huynh
(74) *Attorney, Agent, or Firm* — Muncy, Geissler, Olds & Lowe, P.C.

(57) ABSTRACT

A long-term navigation method using an inertial unit associated with a system of axes X, Y, Z and mounted on a vehicle traveling relative to the Earth in order to measure its movements relative to an inertial frame of reference having axes Xi, Yi, and Zi. The method includes the steps of acting in permanent manner to measure an orientation of the system of axes X, Y, Z in the inertial frame of reference and applying a predetermined sequence of turnovers to the inertial unit in the inertial frame of reference about first and second axes that are substantially perpendicular to each other and in such a manner that at the end of the sequence the inertial unit is in a final orientation identical to its initial orientation relative to the inertial frame of reference, with the turnovers canceling within the sequence.

13 Claims, 3 Drawing Sheets

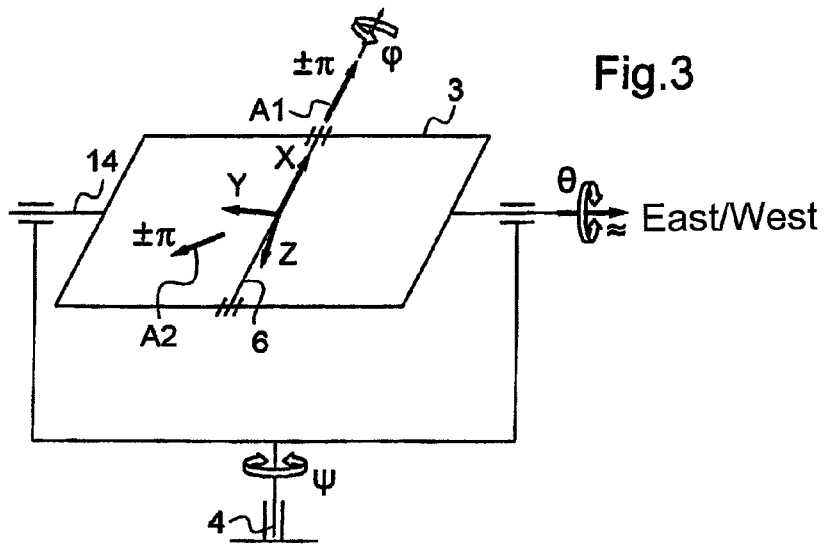

METHOD AND DEVICE FOR LONG-DURATION NAVIGATION

FIELD OF THE INVENTION

The present invention relates to a method for long-term navigation of a vehicle by means of an inertial navigation unit associated with the vehicle. The vehicle may be a terrestrial vehicle, an aircraft, or a ship, with navigation thereof requiring knowledge of its position, its speed, and its attitude (heading, roll, and pitch). The invention also relates to a navigation device for implementing the method.

BACKGROUND OF THE INVENTION

A modern inertial navigation unit generally comprises inertial sensors such as gyros and accelerometers arranged on axes of a measurement axis system associated with a support platform for the inertial unit. The gyros measure angular rotations of the measurement axis system relative to a geographical frame of reference and they supply the attitude of the vehicle in the geographical frame of reference. The accelerometers measure accelerations that are projected onto the geographical frame of reference and then integrated a first time in order to provide speed, and then a second time in order to provide position. The accuracy of an inertial navigation unit depends directly on the errors of the inertial sensors (gyros and accelerometers), and more precisely on the projection of those errors onto the local geographical frame of reference; and when performing long-term inertial navigation, the position errors depend mainly on the accuracy of the gyros. The accuracy of the gyros is affected by drift errors (shifting of the measurement origin, such that a magnitude of zero is not always measured as being zero), by scale factors (a scale factor error is an error concerning the coefficients by which the measurement is multiplied), and by axis setting errors (orthogonality error between the measurement axes).

Document FR-A-2 824 393 discloses a method of navigation by means of an inertial unit having tied components mounted on a mechanical device that enables the unit to be placed in a succession of different positions in order to average out the errors of the gyros as projected onto the local geographical system of axes. The attitude information output by the inertial unit with tied components can be used directly for controlling the mechanical device for the purpose of placing the unit successively in different positions that are substantially stationary relative to the local geographical system of axes. More precisely, the long-term navigation method is implemented by means of an inertial unit that is associated with a tied system of axes X, Y, Z mounted on a carrier in order to measure therefrom movements relative to a geographical system of axes having fixed directions along three axes Xg, Yg, Zg, and comprising:
  measurement actions consisting in using the inertial unit to permanently measure an orientation of the tied system of axes in the geographical system of axes; and
  positioning actions consisting in applying a sequence of cycles of turning the inertial unit over eight times, each turnover maintaining the axis Y in a direction parallel to the axis Yg, with a succession of two turnovers about the axis X being preceded and followed by a turnover about the axis Z, and with a succession of two turnovers about the axis Z being preceded and followed by a turnover about the axis X.

The positioning actions serve to compensate measurement errors by sign reversal along the axis Y on each turnover, by sign reversal along the axis X on each turnover about the axis Z, and by sign reversal along the axis Z at each turnover about the axis X. The measurement actions that are performed permanently then enable the errors on each of the axes X, Y, and Z of the tied system of axes to compensate mutually so as to reduce the projections of errors onto the axes Xg, Yg, and Zg by averaging their contributions over a cycle.

The method provides significant improvements in accuracy. In contrast, it is necessary to proceed with strap-down type integration of the measurements coming from the gyros. Unfortunately, such measurements include noise that, on being integrated, gives rise to navigation errors such as random walks. Those errors have an influence on the degradation of navigation performance. In addition, the measurements provided by the gyros incorporate a component associated with rotation of the Earth and thus affected by the scale factor errors specific to each gyro.

Furthermore, the method described in that document can be used only with sensors having drift error that remains constant over the entire measurement range. That method is therefore not suitable for use with vibratory gyros that are conventionally used in inertial systems used for navigation, e.g. as happens in a gyro-compass adapted to provide an angle measurement relative to a reference direction (or heading) such as geographical north. Vibratory gyros are axially symmetrical Coriolis effect gyros known as Coriolis vibratory gyros (CVG), e.g. hemispherical resonator gyros (HRG), and they are generally said to be of type I in the document "Type I and type II micromachined vibratory gyroscopes" by Andrei M. Shkel, pp. 586-593, IEEE/ION ("Institute of Electrical and Electronics Engineers/Institute of Navigation"), PLANS 2006, San Diego, Calif., USA. Those gyros operate in particular in an open loop and they enable an absolute angle of rotation to be measured on the basis of measuring an angle representing the vibration position of the gyro relative to measurement electrodes. The measurements provided by such vibratory gyros may suffer from errors that are essentially a function of the position of the vibration relative to the measurement electrode. Those errors thus vary as a function of the vibration position as represented by its electrical angle.

SUMMARY OF THE INVENTION

An object of the invention is to further improve the accuracy of long-term navigation by means of an inertial unit.

To this end, the invention provides a method of long-term navigation by means of an inertial unit having at least three gyros and at least three accelerometers associated with a system of axes X, Y, Z and mounted on a vehicle traveling relative to the Earth in order to measure movements relative to an inertial frame of reference having axes Xi, Yi, Zi, the method comprising the steps of:
  using the gyros in permanent manner to measure an orientation of the system of axes X, Y, Z in the inertial frame of reference; and
  starting from an initial orientation of the inertial unit, applying a predetermined sequence of turnovers to the inertial unit in the inertial frame of reference about a first axis and about a second axis, which axes are substantially perpendicular to each other in such a manner that:
    at the end of the sequence, the inertial unit is in a final orientation identical to its initial orientation relative to the inertial frame of reference;
    the turnovers cancel mutually within the sequence; and
    a succession of two turnovers about the first axis is preceded and followed by a turnover about the second axis, and a succession of two turnovers about the second axis is preceded and followed by a turnover about the first axis.

The sequence of turnovers enables drifts of the gyros to be canceled. Since the sequence of turnovers is performed in the inertial axis system and since the final orientation is identical to the initial orientation in the inertial axis system, overall rotation at the end of the cycle of turnovers is zero and unaffected by rotation of the Earth, thereby making the navigation performance independent of scale factor errors. The matrix for transferring from the accelerometric measurement system of axes to the inertial frame of reference is cyclic and can be modeled, and there is no need to perform strap-down type integration of rotary velocities in order to determine the orientation of the accelerometric measurement system of axes. This serves to eliminate the influence of noise on measurements of rotation.

In a particular implementation:

at least one of the gyros is an axially symmetrical vibratory gyro; and at least one of the turnover axes is selected to be perpendicular to a sensitive axis of the axially symmetrical vibratory gyro.

The invention thus provides better accuracy for the rotation measurements supplied by this type of gyro. The sequencing of turnovers causes the electrical angle of the vibratory gyro to scan through a range of values corresponding to a single turnover. Since the drift of the vibratory gyro depends on its electrical angle, by maintaining the electrical angle within a narrow range, it is possible to obtain better control over drift.

Advantageously, the turnover axes are selected to be perpendicular to the sensitive axis of the gyro.

The resulting accuracy is even better, with the sequencing of turnovers keeping the electrical angle of the gyro constant.

Preferably, the electrical angle is forced prior to the sequence of turnovers.

This makes it possible to select an electrical angle for which the gyro presents the best performance, e.g. because of drift that is particularly stable and/or small at this electrical angle.

Preferably, the first axis is parallel to a terrestrial polar axis and the second axis is situated in a terrestrial equatorial plane.

It is generally more difficult to obtain gyrometrical measurements on the polar axis. Selecting a turnover axis that coincides with the polar axis serves to enhance the gyro performing a measurement on that axis.

Advantageously, the sequence is capable of being implemented in two alternative configurations as a function of the latitude at which the vehicle is to be found:

for a latitude having an absolute value greater than a predetermined threshold, the second axis is the same for all of the sequences; and for a latitude having an absolute value less than the predetermined threshold, the second axis extends to an intersection between the equatorial plane and a meridian plane on which the vehicle is located, and is determined at the beginning of each sequence.

This makes it possible to implement rotations of the inertial unit with a mechanical turnover device having only three motor-driven shafts, without running the risk of two of the motor-driven shafts lying on axes that come into coincidence. Such a mechanical turnover device is much less expensive and bulky than a mechanical device having four motor-driven shafts as would otherwise be necessary in the absence of two configurations.

In a preferred implementation, the sequence of turnovers comprises at least a first series of eight turnovers, namely a turnover about the first axis in a first direction (R1(+π)), a turnover about the second axis in a first direction (R2(+π)), a turnover about the first axis in a second direction (R1(−π)), a turnover about the first axis in a first direction (R1(+π)), a turnover about the second axis in a second direction (R2(−π)), a turnover about the first axis in a second direction (R1(−π)), a turnover about the second axis in a first direction (R2(+π)), and a turnover about the second axis in a second direction (R2(−π)) and, preferably, the sequence of turnovers comprises a second sequence of eight turnovers, identical to the first sequence except in that the turnover directions are reversed.

This implementation is the implementation that obtains the best performance.

The invention also provides an inertial navigation device comprising a control unit, an inertial unit that has gyros and accelerometers and that is mounted on a turnover device having sensitive axes that are perpendicular to one another and associated with motor drive means connected to the control unit, the control unit being arranged to implement the method.

BRIEF DESCRIPTION OF THE DRAWINGS

Other characteristics and advantages of the invention appear on reading the following description of particular, non-limiting embodiments of the invention.

Reference is made to the accompanying drawings, in which:

FIGS. 2 and 3 are diagrammatic views of the device in two turnover configurations;

FIGS. 4a and 4b show a sequence of turnovers in the first turnover configuration.

DETAILED DESCRIPTION OF THE PREFERRED EMBODIMENTS

Figure 1:
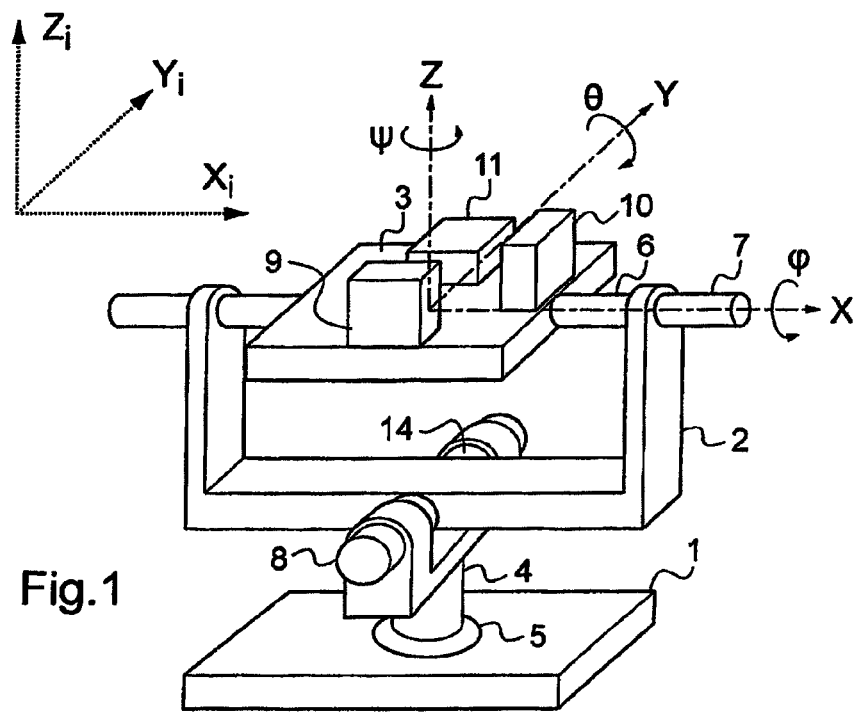
FIG. 1 is a perspective view of a device for implementing the invention.
Figure 2:
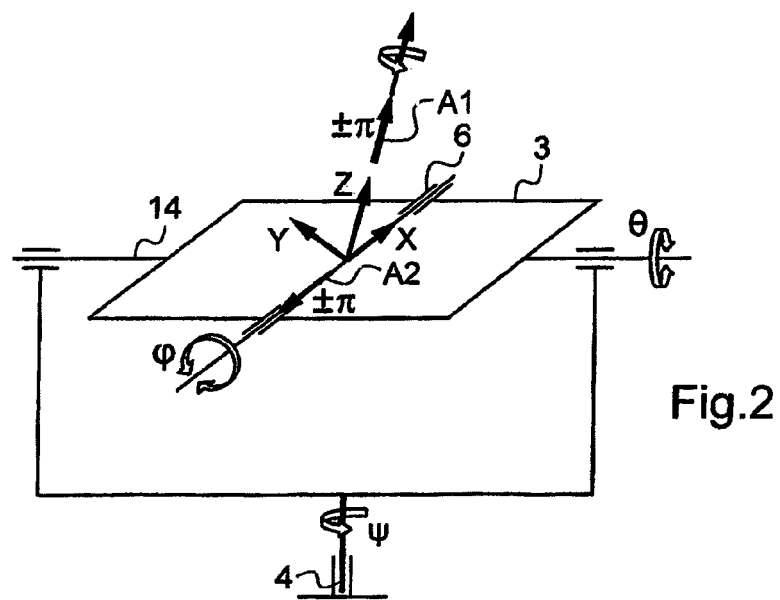

With reference to FIG. 1, a platform 1 is secured to a vehicle, such as a ship, for example. The platform 1 supports a gimbal 2 for keeping three axes X, Y, Z of an axis system associated with an inertial unit 3 along three axes Xi, Yi, Zi of a stationary inertial axis system of arbitrary origin, e.g. the center of the Earth in this example. The axes Xi and Yi lie in an equatorial plane, and the axis Zi points vertically upwards. A first degree of freedom in rotation is given by a shaft 4 that is secured to the vehicle. A motor 5 enables the shaft 4 to be turned so as to eliminate the effects of changes in the heading of the carrier. A second degree of freedom in rotation is given by a shaft 6, secured to the inertial unit 3. A motor 7 enables the shaft 6 to be turned so as to cancel the effects of the carrier turning about the axis of the shaft 6. A third degree of freedom in rotation is given by a third shaft 14 perpendicular to the shafts 4 and 6. A motor 8 enables the third shaft 14 to turn so as to cancel rotations of the vehicle about the axis of the shaft 14. The three above degrees of freedom enable swell and terrestrial rotation movements to be countered, while also performing the turnovers provided for by the method of the invention.

The inertial unit 3 has three gyros 9, 10, and 11 and three accelerometers 19, 20, and 21. The gyros 9, 10, and 11 are axially symmetrical vibratory gyros, each comprising a resonator maintained in vibration and serving to measure an angle by detecting a position of the vibration about an axis of the resonator (electrical angle). The accelerometer 19 measures the accelerations of the inertial unit 3 along the Y axis and the gyro 9 measures rotations of the inertial unit 3 about the Y axis. The accelerometer 20 measures accelerations of the inertial unit 3 along the X axis and the gyro 10 measures rotations of the inertial unit 3 about the X axis. The accelerometer 21 measures accelerations of the inertial unit 3 along the Z axis and the gyro 11 measures rotations of the inertial unit 3 about the Z axis. The gyros 9, 10, and 11 serve to measure the angles of rotation of the inertial unit 3 about each of three axes Xi, Yi, and Zi. It is then possible to perform predetermined turnovers by relying on the angles of rotation as measured by the gyros. The accelerometers 19, 20, and 21 serve to measure the acceleration of the inertial unit 3 along each of the directions of the axes X, Y, and Z. It is then possible to calculate the accelerations of the vehicle along the axes Xi, Yi, and Zi of the inertial frame of reference, by deduction from the measured accelerations, and then to calculate its speed by integration, and then to calculate the position of the vehicle in the inertial frame of reference Xi, Yi, Zi by double integration.

The navigation device includes a control unit (not shown) that is programmed to implement the method of the invention.

The long-term navigation method in accordance with the invention comprises the steps of:
  acting in permanent manner to measure an orientation of the X, Y, Z axis system in the inertial frame of reference Xi, Yi, Zi; and
  from an initial orientation of the inertial unit 3, applying a sequence of turnovers to the inertial unit in the inertial frame of reference Xi, Yi, Zi about a first axis A1 and a second axis A2 that are substantially mutually perpendicular, such that:
    at the end of the sequence, the inertial unit 3 is in a final orientation identical to its initial orientation;
    the turnovers cancel mutually within the sequence; and
    a succession of two turnovers about the first axis A1 is preceded and followed by a turnover about the second axis A2, and a succession of two turnovers about the second axis A2 is preceded and succeeded by a turnover about the first axis A1.

The term "in permanent manner" means that the measurements are performed all along the navigation method, and more particularly during the turnovers. These measurements may be performed continuously or periodically, e.g. by sampling or at regular intervals.

The inertial unit 3 is turned over by turning the shafts 4, 5, and 6 so that a rotation about any one of these shafts and/or a combination of rotations about a plurality of these shafts enables the desired turnover to be performed about the defined turnover axis. The rotation values that enable errors to be averaged with a minimum of individual positions are rotations of $+\pi$ or $-\pi$ about the various axes. The way the turnover device is controlled is described in greater detail in document FR-A-2 824 393.

The axes A1 and A2 are selected in the inertial frame of reference.

Figure 5A:
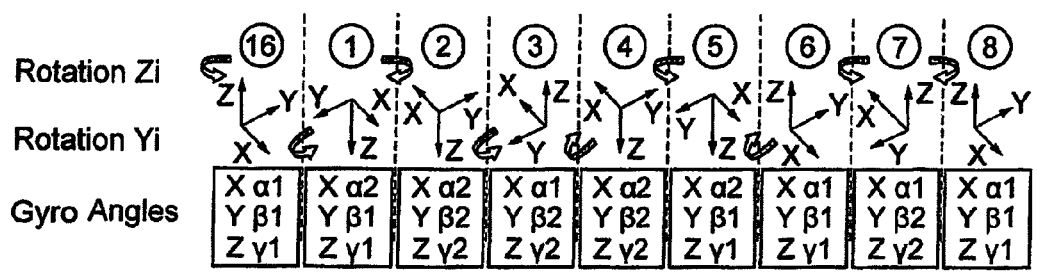
FIGS. 5a and 5b show a sequence of turnovers in the second turnover configuration.
Figure 5B:
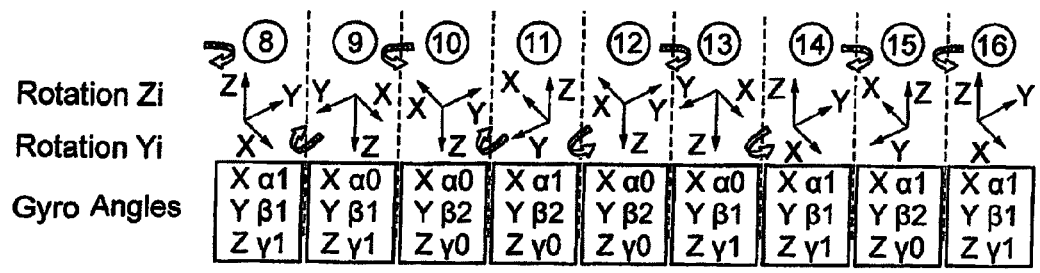

FIGS. 4 and 5 show the turnovers of the measurement system of axes X, Y, Z in the inertial frame of reference about the axes A1 and A2.

The sequencing of the turnovers (numbered 1 to 16) in this example comprises:
  a first series of eight turnovers, i.e. a turnover about the first axis A1 in a first direction R1($+\pi$), a turnover about the second axis A2 in a first direction R2($+\pi$), a turnover about the first axis A1 in a second direction R1($-\pi$), a turnover about the first axis A1 in the first direction R1($+\pi$), a turnover about the second axis A2 in a second direction R2($-\pi$), a turnover about the first axis A1 in the second direction R1($-\pi$), a turnover about the second axis A2 in the first direction R2($+\pi$), and a turnover about the second axis A2 in the second direction R2($-\pi$); and
  a second series of eight turnovers, identical to the first series, except that the turnover directions are reversed.

As can be seen in FIG. 3, when the vehicle is at a latitude greater than about 45°, the axis A1 coincides with the polar axis and thus with the Z axis of the measurement system, and the axis A2 is in an equatorial plane and coincides with the X axis of the measurement system.

The gyros have the X and Z axes as their sensitive axes and thus have their sensitive axes perpendicular to one of the turnover axes, namely A1 and A2, respectively. The above-mentioned turnovers bring the vibrations of these gyros to three electrical angles, namely the electrical angles $\alpha 0$, $\alpha 1$, and $\alpha 2$ (for X) and $\gamma 1$, $\gamma 2$, and $\gamma 3$ (for Z), these angles being constant over a sequence (see FIG. 4).

The gyro having the Y axis as its sensitive axis thus has its sensitive axis perpendicular to the two turnover axes A1 and A2 such that the turnovers will maintain the vibration on the same electrical angle $\beta$.

The electrical angles in question are selected in this example as a function of the drift values of the gyros at these angles, these values being selected to be as stable as possible. In a variant, it is possible to select electrical angles so that the gyro presents the smallest drift at these angles.

Servo-control of the gyros requires knowledge of the angles of the shafts 6 and 14. For this purpose, the shafts 6 and 14 are fitted with code wheels (not shown) that provide the angular positions of said shafts relative to their supports. In a variant, this knowledge may be obtained by comparing the measurements supplied by the inertial unit 3 with those supplied by a second inertial unit that is rigidly fastened to the vehicle.

Using the same electrical angles makes it possible to cancel the effect of gyro drift at these angles by performing the turnovers, the turnovers making it possible along each axis under consideration to sum a projection of the drift and the opposite of said projection.

In addition, since the drifts are also integrated during each turnover operation, each turnover in one direction is also performed in the opposite direction so that the drifts taken into account during the two turnovers cancel mutually.

The transfer matrix Tmi between the measurement axis system and the inertial frame of reference is cyclic (the rotations performed to turn the inertial unit over are always the same) and can be calculated once and for all, or they can be modeled.

When the transfer matrix Tmi has been modeled, the parameters of the model may also be updated periodically in real time on the basis of a Kalman filter working on external information, e.g. coming from another inertial unit or a satellite positioning system.

The transfer matrix Tmi may be resolved into a product of a cyclic matrix Tmî and a matrix Tîi representing the integral of the residue of the gyro drifts appearing over a complete sequence (in spite of the effect of error cancellation resulting from the sequence of turnovers). This makes it possible to take account of residual drifts after a sequence of turnovers.

With reference to FIG. 3, in the configuration adapted to a vehicle situated at a latitude of less than about 45°, the axis A1 coincides with the polar axis and thus with the X axis of the measurement axis system, and the axis A2 is situated at the intersection of the equatorial plane and a plane containing the meridian on which the vehicle is located.

The second axis A2 is thus selected on each sequence in this configuration, whereas in the first configuration (FIG. 3), the second axis A2 is identical for all of the sequences.

As shown in FIG. 5, the above-mentioned turnovers bring the vibration of the gyros having the X and Z axes as their sensitive axes onto three electrical angles, namely the electrical angles α0, α1, and α2 (for X) and γ1, γ2, and γ3 (for Z), these angles being constant over a sequence (see FIG. 4).

The gyro having the Y axis as its sensitive axis now has its sensitive axis perpendicular to a single turnover axis A1 such that the turnovers keep the vibration on two electrical angles β1 and β2.

Naturally, the invention is not limited to the embodiments described above but covers any variant coming within the field of the invention as defined by the claims.

In particular, the invention may be used with gyros of types other than axially symmetrical vibratory gyros, or more generally with Coriolis effect gyros, but also with Sagnac effect gyros such as laser gyros and optical fiber gyros.

The inertial unit may have zero, one, two, or more than three axially symmetrical vibratory gyros.

The inertial unit may also have more than three gyros and more than three accelerometers.

When the sequence has only eight turnovers, the electrical angles of the vibratory gyros travel only over a range defined by two values.

The first turnover axis may lie in the planes XY, YZ, or ZX.

A sequence of turnovers covered by the invention may be performed by circularly permutating the above-described turnover sequences.

Although the predetermined latitude threshold is set at 45° in the implementation described, the predetermined threshold could be different, for example it could be equal to 30°.

The inertial frame of reference may have an orientation different from that described above.

In a variant, each turnover is separated by a predetermined duration from the preceding turnover.

What is claimed is:

1. A method of long-term navigation by means of an inertial unit having at least three gyros and at least three accelerometers associated with a system of axes X, Y, Z and mounted on a vehicle traveling relative to the Earth in order to measure movements relative to an inertial frame of reference having axes Xi, Yi, Zi, the method comprising the steps of:
    using the gyros in permanent manner to measure an orientation of the system of axes X, Y, Z in the inertial frame of reference; and
    starting from an initial orientation of the inertial unit, applying a predetermined sequence of turnovers to the inertial unit in the inertial frame of reference about a first axis and about a second axis, which axes are substantially perpendicular to each other in such a manner that:
        at the end of the sequence, the inertial unit is in a final orientation identical to its initial orientation relative to the inertial frame of reference;
        the turnovers cancel mutually within the sequence; and
        a succession of two turnovers about the first axis is preceded and followed by a turnover about the second axis, and a succession of two turnovers about the second axis is preceded and followed by a turnover about the first axis.

2. The method according to claim 1, wherein:
    at least one of the gyros is an axially symmetrical vibratory gyro; and
    at least one of the turnover axes is selected to be perpendicular to a sensitive axis of the axially symmetrical vibratory gyro.

3. The method according to claim 2, wherein the turnover axes are selected to be perpendicular to the sensitive axis of the gyro.

4. The method according to claim 2, wherein the electrical angle is forced prior to the sequence of turnovers.

5. The method according to claim 1, wherein the first axis is parallel to a terrestrial polar axis and the second axis is situated in a terrestrial equatorial plane.

6. The method according to claim 5, wherein the sequence is capable of being implemented in two alternative configurations as a function of the latitude at which the vehicle is to be found:
    for a latitude having an absolute value greater than a predetermined threshold, the second axis is the same for all of the sequences; and
    for a latitude having an absolute value less than the predetermined threshold, the second axis extends to an intersection between the equatorial plane and a meridian plane on which the vehicle is located, and is determined at the beginning of each sequence.

7. The method according to claim 1, wherein the sequence of turnovers comprises at least a first series of eight turnovers, namely a turnover about the first axis in a first direction (R1(+π)), a turnover about the second axis in a first direction (R2(+π)), a turnover about the first axis in a second direction (R1(-π)), a turnover about the first axis in a first direction (R1(+π)), a turnover about the second axis in a second direction (R2(-π)), a turnover about the first axis in a second direction (R1(-π)), a turnover about the second axis in a first direction (R2(+π)), and a turnover about the second axis in a second direction (R2(+π)).

8. The method according to claim 7, wherein the sequence of turnovers comprises a second sequence of eight turnovers, identical to the first sequence except in that the turnover directions are reversed.

9. The method according to claim 1, wherein each turnover is separated by a predetermined duration from the preceding turnover.

10. The method according to claim 1, including a step of integrating accelerations in the inertial frame of reference by using a matrix for transferring from the measurement system of axes to the inertial frame of reference, the transfer matrix being cyclic and representing the sequence of turnovers.

11. The method according to claim 10, wherein the transfer matrix is modeled with parameters that are updated periodically on the basis of external information.

12. An inertial navigation device comprising a control unit, an inertial unit that has gyros and accelerometers and that is mounted on a turnover device having sensitive axes that are perpendicular to one another and associated with motor drive means connected to the control unit, the control unit being arranged to implement the method according to claim 1.

13. The device according to claim 12, having three motor-driven shafts with the control unit being arranged to implement the method in accordance with claim 6.

* * * * *